US010461652B2

(12) United States Patent
Tang et al.

(10) Patent No.: US 10,461,652 B2
(45) Date of Patent: Oct. 29, 2019

(54) FLYBACK POWER CONVERTER AND SECONDARY SIDE CONTROL CIRCUIT THEREOF

(71) Applicant: RICHTEK TECHNOLOGY CORPORATION, Zhubei, Hsinchu (TW)

(72) Inventors: Chien-Fu Tang, Hsinchu (TW); Jo-Yu Wang, New Taipei (TW); Isaac Y. Chen, Zhubei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 16/132,367

(22) Filed: Sep. 15, 2018

(65) Prior Publication Data

US 2019/0115844 A1    Apr. 18, 2019

Related U.S. Application Data

(60) Provisional application No. 62/573,646, filed on Oct. 17, 2017.

(30) Foreign Application Priority Data

Jun. 14, 2018    (CN) .......................... 2018 1 0613592

(51) Int. Cl.
*H02M 3/335*    (2006.01)
*H02M 1/08*    (2006.01)

(52) U.S. Cl.
CPC ......... *H02M 3/33592* (2013.01); *H02M 1/08* (2013.01)

(58) Field of Classification Search
CPC .......................... H02M 3/33592; H02M 1/08
See application file for complete search history.

(56) References Cited

U.S. PATENT DOCUMENTS

| 2010/0027298 | A1* | 2/2010 | Cohen | H02M 3/33592 |
| | | | | 363/21.14 |
| 2011/0096578 | A1* | 4/2011 | Fang | H02M 3/33592 |
| | | | | 363/127 |
| 2014/0211517 | A1* | 7/2014 | Gong | H02M 3/33592 |
| | | | | 363/21.14 |
| 2015/0280573 | A1* | 10/2015 | Gong | H02M 3/33523 |
| | | | | 363/21.14 |
| 2016/0111961 | A1* | 4/2016 | Balakrishnan | H02M 3/33507 |
| | | | | 363/21.12 |

(Continued)

*Primary Examiner* — Kyle J Moody
(74) *Attorney, Agent, or Firm* — Tung & Associates

(57) ABSTRACT

A flyback power converter includes: a transformer, a power switch, a switch control unit, a synchronous rectifier switch and a secondary side control circuit. The secondary side control circuit includes: a switch signal generation circuit and a first power conversion circuit. The secondary side control circuit is coupled to the synchronous rectifier switch and the secondary winding of the transformer. The switch signal generation circuit generates the synchronous rectifier switch signal selectively according to a first power or a second power, to control the synchronous rectifier switch. The first power is related to the output voltage. The first power conversion circuit generates the second power according to a secondary phase signal on a phase node between the secondary winding of the transformer and the synchronous rectifier switch.

23 Claims, 11 Drawing Sheets

(56) References Cited

U.S. PATENT DOCUMENTS

| | | | |
|---|---|---|---|
| 2017/0033698 A1* | 2/2017 | Vemuri | H02M 3/33592 |
| 2017/0155335 A1* | 6/2017 | Chang | H02M 1/08 |
| 2018/0062530 A1* | 3/2018 | Kong | H02M 1/08 |
| 2018/0212527 A1* | 7/2018 | Kong | H02M 3/33592 |
| 2018/0301999 A1* | 10/2018 | Moon | H02M 3/33592 |
| 2018/0367045 A1* | 12/2018 | Zhang | H02M 1/08 |
| 2018/0367052 A1* | 12/2018 | Gong | H02M 3/33592 |

* cited by examiner

US 10,461,652 B2

FLYBACK POWER CONVERTER AND SECONDARY SIDE CONTROL CIRCUIT THEREOF

CROSS REFERENCE

The present invention claims priority to U.S. 62/573,646, filed on Oct. 17, 2017, and CN 201810613592.2, filed on Jun. 14, 2018.

BACKGROUND OF THE INVENTION

Field of Invention

The present invention relates to a flyback power converter and a secondary side control circuit thereof. In particular, the present invention relates to a secondary side control circuit of a flyback power converter, which is capable of generating a synchronous rectifier switch signal according to a first power related to an output voltage or a second power related to a secondary phase signal, to control the synchronous rectifier switch at the secondary side.

Description of Related Art

Please refer to FIG. 1 and FIG. 2. FIG. 1 shows a prior art flyback power converter. FIG. 2 shows relationship between the gate-source voltage and the conduction resistance of a power switch in the prior art flyback power converter. The prior art flyback power converter 100 comprises: a transformer 15, a power switch 17, a switch control unit 13, a feedback circuit 14, a synchronous rectifier switch 18 and a secondary side control circuit 12.

In this prior art, the secondary side control circuit 12 generates a synchronous rectifier switch signal SVG according to a secondary side level detection signal S_VTR, to control a synchronous rectifier switch 18. In this prior art, the secondary side level detection signal S_VTR is generated via a secondary side phase node D of the synchronous rectifier switch 18. The secondary side level detection signal S_VTR is inputted into a pin VTR of the secondary side control circuit 12 through a voltage-divider resistor circuit.

In this prior art, because the secondary side control circuit 12 only receives the power S_VDD related to the output voltage VOUT via a pin VDD, there is an undesirable drawback. Referring to FIG. 2, when the power S_VDD related to the output voltage VOUT is too low (for example lower than 5V), the conduction resistance of the synchronous rectifier switch 18 dramatically increases; the synchronous rectifier switch 18 cannot be fully conductive, and this lowers the power conversion efficiency.

In view of the above, to overcome the drawbacks in the prior art, the present invention provides a flyback power converter and a secondary side control circuit thereof, which are capable of generating a synchronous rectifier switch signal according to a first power related to an output voltage or a second power related to a secondary phase signal, to control the synchronous rectifier switch at the secondary side. In other words, the present invention can adaptively select the first power or the second power based upon different situations, to ensure that the generated synchronous rectifier switch signal is well able to fully turn ON the synchronous rectifier switch 18 under any different situations.

SUMMARY OF THE INVENTION

From one perspective, the present invention provides a flyback power converter, which is configured to operably convert an input voltage to an output voltage at an output terminal of the flyback power converter, the flyback power converter comprising: a transformer, including a primary winding coupled to the input voltage and a secondary winding coupled to the output voltage; a power switch coupled to the primary winding, wherein the power switch is configured to be turned ON or OFF according to an operation signal, to control the primary winding so that the input voltage is converted to the output voltage; a switch control unit coupled to the power switch, wherein the switch control unit is configured to operably generate the operation signal according to a feedback signal related to the output voltage; asynchronous rectifier switch, which is coupled in serial to the secondary winding, wherein the synchronous rectifier switch and the secondary winding are coupled between the output terminal and a ground voltage level, and the synchronous rectifier switch and the secondary winding are coupled to each other through a secondary phase node, wherein the synchronous rectifier switch is configured to be turned ON or OFF according to a synchronous rectifier switch signal, so as to provide a synchronous rectification function; and a secondary side control circuit, which is coupled to the synchronous rectifier switch and the secondary winding, the secondary side control circuit including: a switch signal generation circuit, which is configured to operably generate the synchronous rectifier switch signal selectively according to a first power or a second power, to control the synchronous rectifier switch, wherein the first power is related to the output voltage and the second power is not the first power; and a first power conversion circuit, which is configured to operably convert a secondary phase signal, to generate the second power, wherein the secondary phase signal is a voltage signal on the secondary phase node.

From another perspective, the present invention provides a secondary side control circuit of the flyback power converter, the flyback power converter being configured to operably convert an input voltage to an output voltage at an output terminal of the flyback power converter, wherein the flyback power converter includes: a transformer, including a primary winding coupled to the input voltage and a secondary winding coupled to the output voltage; a power switch coupled to the primary winding, wherein the power switch is configured to be turned ON or OFF according to an operation signal, to control the primary winding so that the input voltage is converted to the output voltage; a switch control unit coupled to the power switch, wherein the switch control unit is configured to operably generate the operation signal according to a feedback signal related to the output voltage; a synchronous rectifier switch, which is coupled in serial to the secondary winding, wherein the synchronous rectifier switch and the secondary winding are coupled between the output terminal and a ground voltage level, and the synchronous rectifier switch and the secondary winding are coupled to each other through a secondary phase node, wherein the synchronous rectifier switch is configured to be turned ON or OFF according to a synchronous rectifier switch signal, so as to provide a synchronous rectification function; the secondary side control circuit being coupled to the synchronous rectifier switch and the secondary winding of the transformer, the secondary side control circuit comprising: a switch signal generation circuit, which is configured to operably generate the synchronous rectifier switch signal selectively according to a first power or a second power, to control the synchronous rectifier switch, wherein the first power is related to the output voltage and the second power is not the first power; and a first power conversion circuit, which is configured to operably convert a secondary phase signal, to generate the second power, wherein the secondary phase signal is a voltage signal on the secondary phase node.

In one embodiment, the switch signal generation circuit includes: a power selection circuit, which is configured to operably compare a level of the first power with a first reference threshold, to determine whether to select the first power or the second power, and convert the selected one to a third power; and a driver circuit, which is configured to operably generate the synchronous rectifier switch signal by adopting the third power as a power source of the driver circuit; wherein, when the level of the first power is greater than the first reference threshold, the power selection circuit selects the first power and converts the first power to the third power; wherein, when the level of the first power is smaller than the first reference threshold, the power selection circuit, during at least a period, selects the second power and converts the second power to the third power.

In one embodiment, the first reference threshold is a level of the second power.

In one embodiment, when the level of the first power is smaller than the first reference threshold, the power selection circuit further compares the synchronous rectifier switch signal with a second reference threshold, to determine whether to select the first power or the second power; wherein, when the synchronous rectifier switch signal is greater than the second reference threshold, the power selection circuit selects the first power and converts the first power to the third power; wherein, when the synchronous rectifier switch signal is smaller than the second reference threshold, the power selection circuit selects the second power and converts the second power to the third power.

In one embodiment, when the level of the first power is smaller than the level of the second power, the power selection circuit further compares the synchronous rectifier switch signal with a second reference threshold, to select and convert the first power or the second power; wherein, when the synchronous rectifier switch signal is greater than the second reference threshold, the power selection circuit selects the first power and converts the first power to the third power; wherein, when the synchronous rectifier switch signal is smaller than the second reference threshold, the power selection circuit selects the second power and converts the second power to the third power.

In one embodiment, information of the level of the first power is obtained according to a waveform of the secondary phase signal.

In one embodiment, the first power conversion circuit includes a low dropout (LDO) regulator or a switching regulator.

In one embodiment, the power selection circuit includes: a comparison circuit, which is configured to operably compare the level of the first power with the first reference threshold, to output a first switch control signal and a second switch control signal; a first switch, which is coupled to the first power and which is configured to be turned ON or OFF according to the first switch control signal; and a second switch, which is coupled to the second power and which is configured to be turned ON or OFF according to the second switch control signal; wherein, when the level of the first power is greater than the first reference threshold, the first switch control signal controls the first switch to be ON while the second switch control signal controls the second switch to be OFF, whereby the power selection circuit selects the first power and converts the first power to the third power; wherein, when the level of the first power is smaller than the first reference threshold, the first switch control signal controls the first switch to be OFF while the second switch control signal controls the second switch to be ON, whereby the power selection circuit selects the second power and converts the second power to the third power.

In one embodiment, when the level of the first power is smaller than the first reference threshold, the comparison circuit further compares the synchronous rectifier switch signal with the second reference threshold, to determine whether to select the first power or the second power; wherein, when the synchronous rectifier switch signal is smaller than the second reference threshold, the first switch control signal controls the first switch to be ON while the second switch control signal controls the second switch to be OFF, whereby the power selection circuit selects the first power and converts the first power to the third power; wherein, when the synchronous rectifier switch signal is greater than the second reference threshold, the first switch control signal controls the first switch to be OFF while the second switch control signal controls the second switch to be ON, whereby the power selection circuit selects the second power and converts the second power to the third power.

In one embodiment, when the first switch is ON, the first power is provided directly as the third power; or when the second switch is ON, the second power is provided directly as the third power.

In one embodiment, the power selection circuit further includes: a second power conversion circuit, which is configured to operably convert the first power or the second power to the third power.

In one embodiment, the second power conversion circuit includes a low dropout (LDO) regulator or a switching regulator.

In one embodiment, a current output terminal of the synchronous rectifier switch is coupled to the secondary phase node and a current input terminal of the synchronous rectifier switch is coupled to the ground voltage level.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
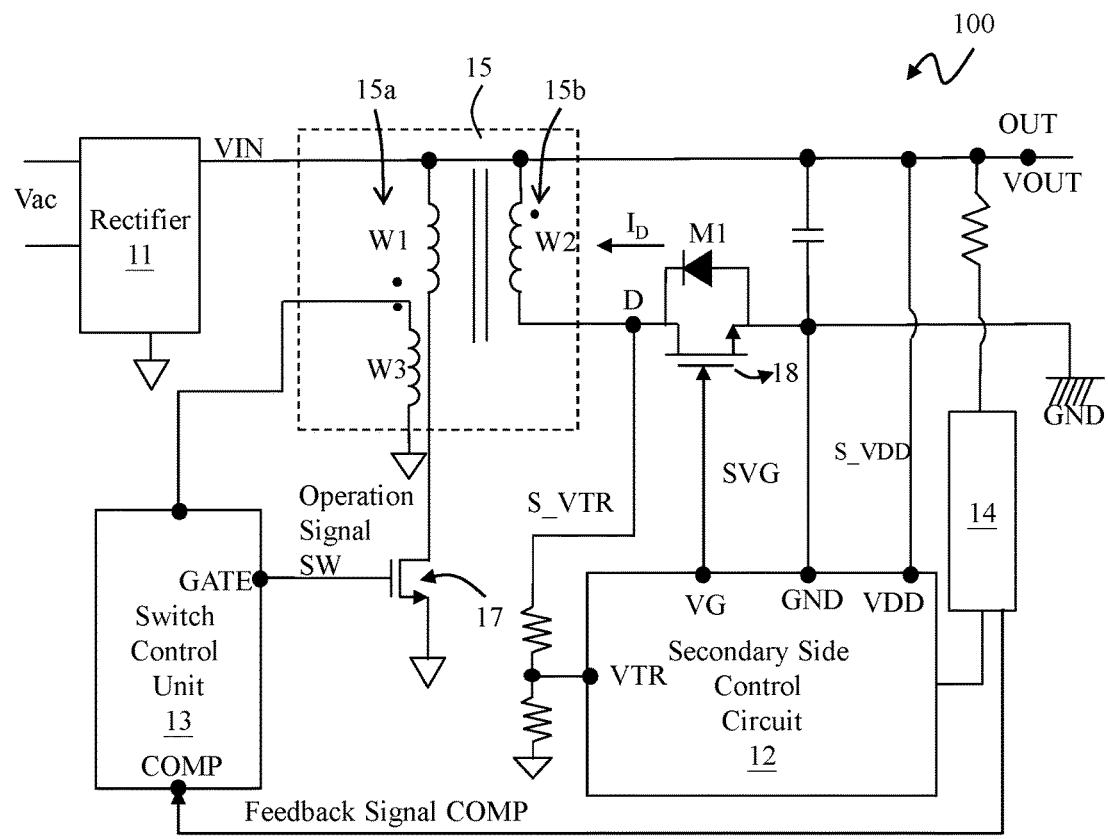
FIG. 1 shows a prior art flyback power converter.
Figure 2:
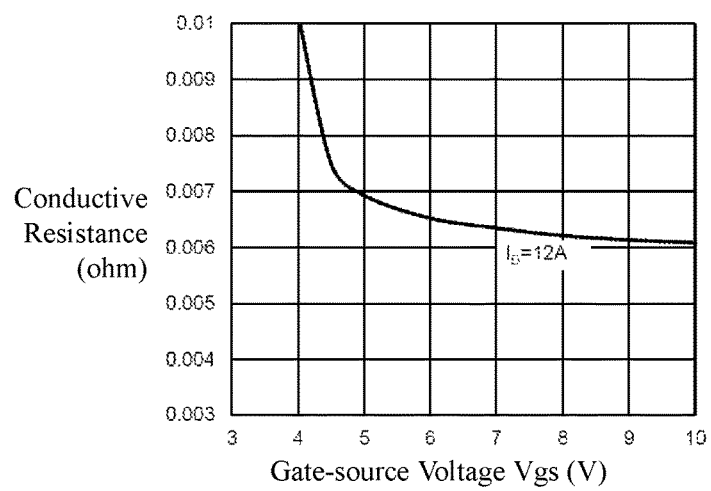
FIG. 2 shows relationship between the gate-source voltage and the conduction resistance of a power switch.
Figure 3:
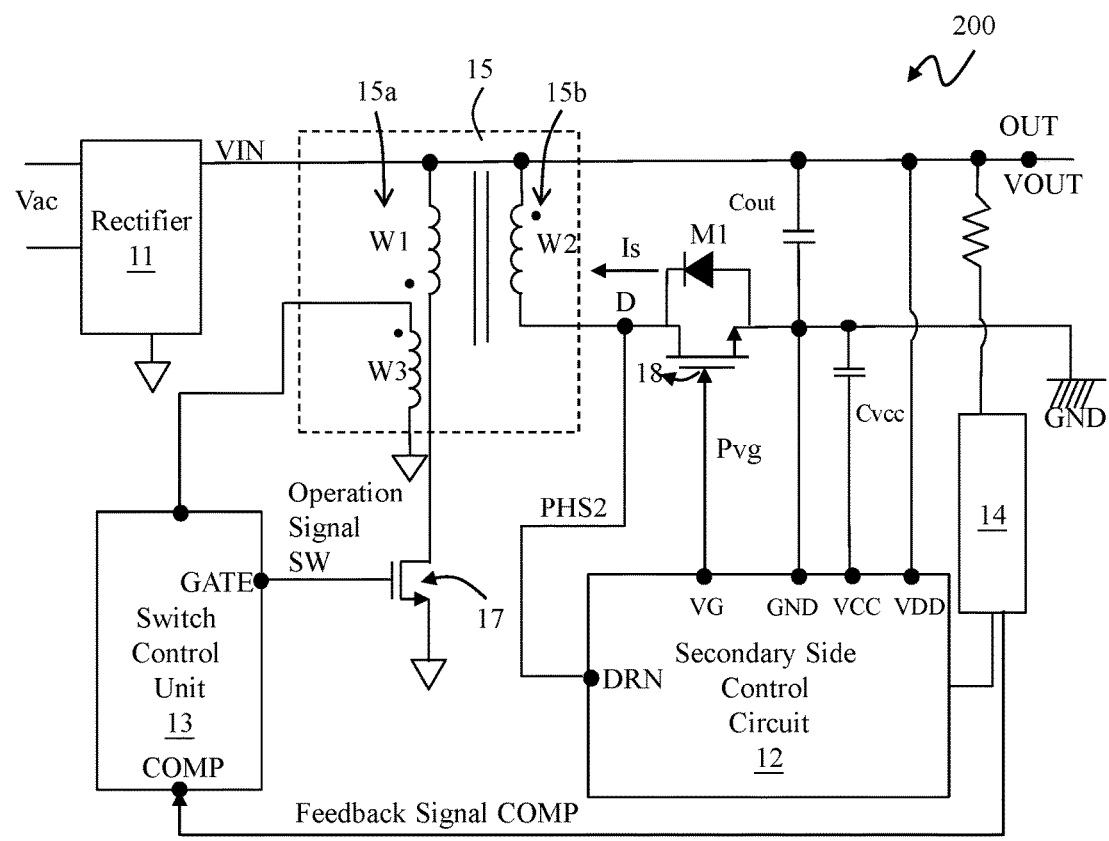
FIG. 3 shows an embodiment of a flyback power converter according to the present invention.

Please refer to FIG. 3, which shows an embodiment of a flyback power converter according to the present invention.

In this embodiment, the flyback power converter 200 can be, for example but not limited to, an isolated type AC-DC converter. In the embodiment of the isolated type AC-DC converter, the flyback power converter 200 can convert an input voltage VIN to an output voltage VOUT at an output terminal OUT of the flyback power converter 200. The flyback power converter 200 comprises: a transformer 15, a power switch 17, a switch control unit 13, a synchronous rectifier switch 18 and a secondary side control circuit 12.

In addition, the flyback power converter 200 of this embodiment can optionally comprise a feedback circuit 14. Because the isolated type AC-DC converter is well known to those skilled in the art, for the sake of simplicity in figures, only circuit details relevant to the present invention are illustrated, while the other circuit details irrelevant to the present invention are omitted.

The transformer 15 includes a primary winding W1, a secondary winding W2 and a tertiary winding W3. The primary winding W1 is at a primary side 15a of the transformer 15, for receiving the input voltage VIN. The secondary winding W2 is at a secondary side 15b of the transformer 15, for generating the output voltage VOUT at an output terminal OUT. In one embodiment, the input voltage VIN can be generated via an alternating power supply Vac through a rectifier 11.

The power switch 17 is coupled to the primary winding W1 of the transformer 15 and is turned ON or OFF according to an operation signal SW, to control a current flowing through the primary winding W1, so that the input voltage VIN is converted to the output voltage VOUT through induction between the primary winding W1 and the secondary winding W2.

The switch control unit 13 is coupled to the power switch 17 and is configured to operably generate the operation signal SW (which is outputted from an operation signal terminal GATE of the switch control unit 13), to control the power switch 17. In this embodiment, the switch control unit 13 generates the operation signal SW according to the feedback signal COMP. The feedback signal COMP can be generated through, for example but not limited to, a primary side feedback loop or a secondary side feedback loop. In one embodiment, the tertiary winding W3 is at a primary side 15a of the transformer 15, for generating information related to the input voltage VIN and/or the output voltage VOUT according to the input voltage VIN, wherein information related to the input voltage VIN and/or the output voltage VOUT can be regarded as primary side feedback information. In one embodiment, the tertiary winding W3 can supply power to the switch control unit 13.

The synchronous rectifier switch 18 is coupled in serial to the secondary winding W2 of the transformer 15, wherein the synchronous rectifier switch 18 and the secondary winding W2 of the transformer 15 are coupled between the output terminal OUT and a ground voltage level GND. And, the synchronous rectifier switch 18 and the secondary winding W2 of the transformer 15 are coupled with each other through a secondary phase node D. In this embodiment, the synchronous rectifier switch 18 is turned ON or OFF according to a synchronous rectifier switch signal Pvg, so as to provide synchronous rectification function. In one embodiment, a current output terminal of the synchronous rectifier switch 18 is coupled to the secondary phase node D and a current input terminal of the synchronous rectifier switch 18 is coupled to the ground voltage level GND.

In this embodiment, the power switch 17 and the synchronous rectifier switch 18 can be, for example but not limited to, NMOS transistor switches. In another embodiment, the power switch 17 and the synchronous rectifier switch 18 can be PMOS transistor switches. In the following description, the present invention will be explained by taking a high level of a signal to represent ON and a low level of the signal to represent OFF. However, in another embodiment, the meaning of high and low levels can be interchanged, with corresponding amendments of the circuits processing these signals.

In one embodiment, the synchronous rectifier switch 18 can further include a diode M1. A current input terminal of the diode M1 is coupled to the ground voltage level GND and a current output terminal of the diode M1 is coupled to the secondary winding W2 of the transformer 15. The diode M1 can be a parasitic diode of the synchronous rectifier switch 18, or, the diode M1 can be a diode device connected in parallel with the synchronous rectifier switch 18, which may be a general diode or a Zener diode.

In this embodiment, the secondary side control circuit 12 is coupled to the synchronous rectifier switch 18 and the secondary winding W2 of the transformer 15.

The secondary side control circuit 12 of the present invention can generate the synchronous rectifier switch signal Pvg according to a first power S_VDD or a second power S_VCC (i.e., generating the synchronous rectifier switch signal Pvg selectively according to one of the first power S_VDD and the second power S_VCC), to control the synchronous rectifier switch 18. In this embodiment, the first power S_VDD is related to the output voltage VOUT and the second power S_VCC is related to a secondary phase signal PHS2. In one embodiment, as shown in FIG. 3, the first power S_VDD which is related to the output voltage VOUT is directly connected to the output voltage VOUT.

Figure 4:
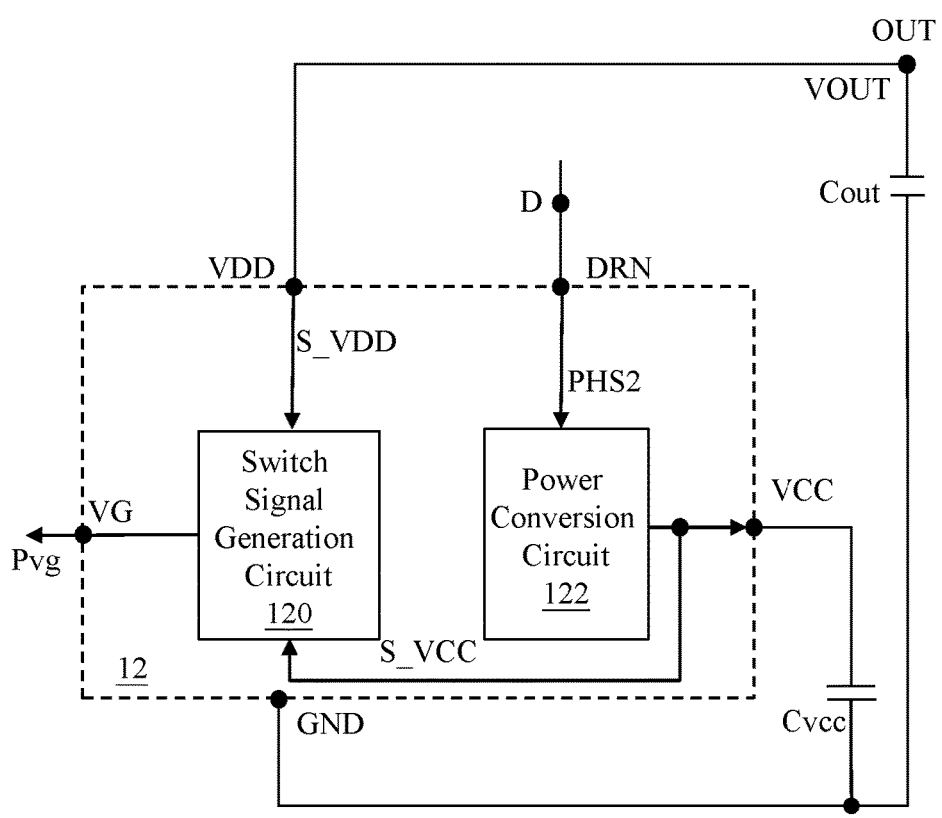
FIG. 4 shows an embodiment of a secondary side control circuit according to the present invention.
Figures 6A, 6B:
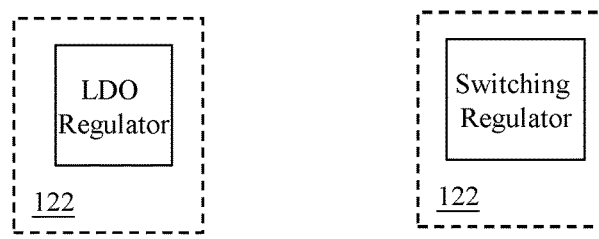
FIG. 6A shows an embodiment of a power conversion circuit 122 of a secondary side control circuit according to the present invention.
FIG. 6B shows another embodiment of a power conversion circuit 122 of a secondary side control circuit according to the present invention.

Please refer to FIG. 4, which shows an embodiment of a secondary side control circuit 12 according to the present invention. As shown in FIG. 4, the secondary side control circuit 12 of the present invention includes: a switch signal generation circuit 120 and a power conversion circuit 122. The switch signal generation circuit 120 is configured to operably generate the synchronous rectifier switch signal Pvg selectively according to the first power S_VDD or the second power S_VCC, to control the synchronous rectifier switch 18. The first power S_VDD is related to the output voltage VOUT. The power conversion circuit 122 is configured to generate the second power S_VCC according to a secondary phase signal PHS2. In one embodiment, the power conversion circuit 122 can be, for example but not limited to, a low dropout (LDO) regulator (as shown in FIG. 6A) or a switching regulator (as shown in FIG. 6B). And, the power conversion circuit 122 is configured to operably convert the secondary phase signal PHS2 to the second power S_VCC. The second power S_VCC can be higher than or lower than the level of the secondary phase signal PHS2. In one embodiment, the second power S_VCC can be a fixed voltage or a variable voltage.

As mentioned above, when the output voltage VOUT is low, if the synchronous rectifier switch 18 is driven according to the first power S_VDD which is related to the output voltage VOUT, the conduction resistance of the synchronous rectifier switch 18 may be high, leading to undesirable conduction power loss. According to the present invention, because the level of the secondary phase signal PHS2 is sometimes higher during certain period, the present invention generates the second power S_VCC from the secondary phase signal PHS2 and provides the second power S_VCC as a selectable power supply to the secondary side control circuit 12, that is, the present invention can adaptively select the first power S_VDD or the second power S_VCC based upon different situations, to ensure that the generated synchronous rectifier switch signal Pvg is well able to fully turn ON the synchronous rectifier switch 18 under any situation, thereby improving power conversion efficiency. The term "fully conductive" as described herein should be construed according to the general knowledge in the field of semiconductor, that is, a "fully conductive" transistor is conductive and operating beyond its linear region such that its resistance is minimum or near minimum. In one aspect, the first power S_VDD and the second power S_VCC are configured to supply power to the switch signal generation circuit 120 (selectable by the switch signal generation circuit 120), so that the synchronous rectifier switch signal Pvg can reach to a desired level under any situation, to ensure that the synchronous rectifier switch 18 operates by a low conduction resistance. In one embodiment, the second power S_VCC can be higher than a predetermined voltage level, to ensure that the conduction resistance of the synchronous rectifier switch 18 is lower than a conduction resistance threshold. The features and the details as to how the present invention can adaptively select the first power S_VDD or the second power S_VCC based upon different situations will be described later.

Figure 5:
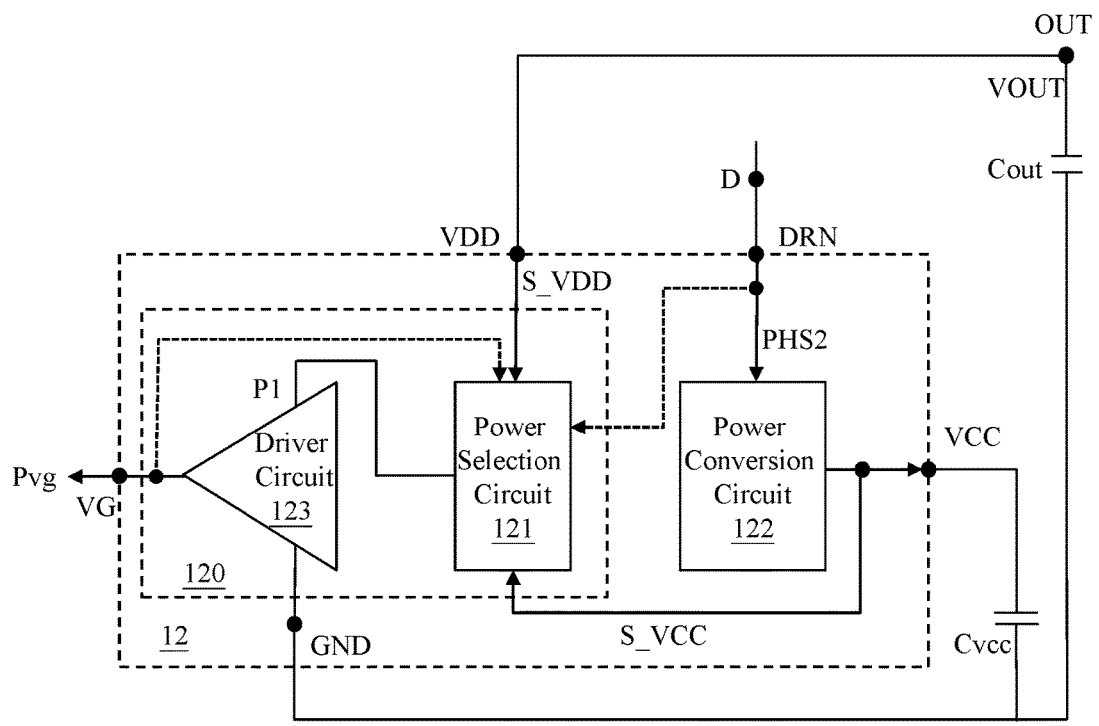
FIG. 5 shows a specific embodiment of a secondary side control circuit according to the present invention.
Figure 7A:
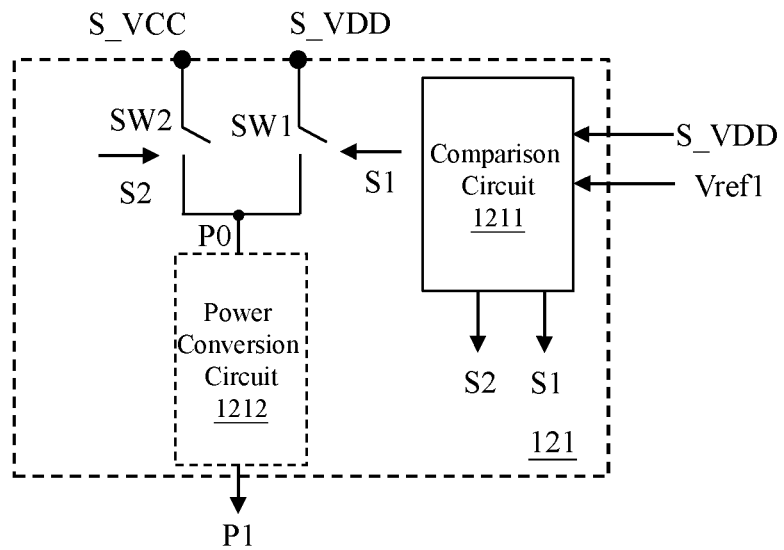
FIG. 7A shows an embodiment of a power selection circuit 121 of a switch signal generation circuit 120 according to the present invention.
Figure 11A:
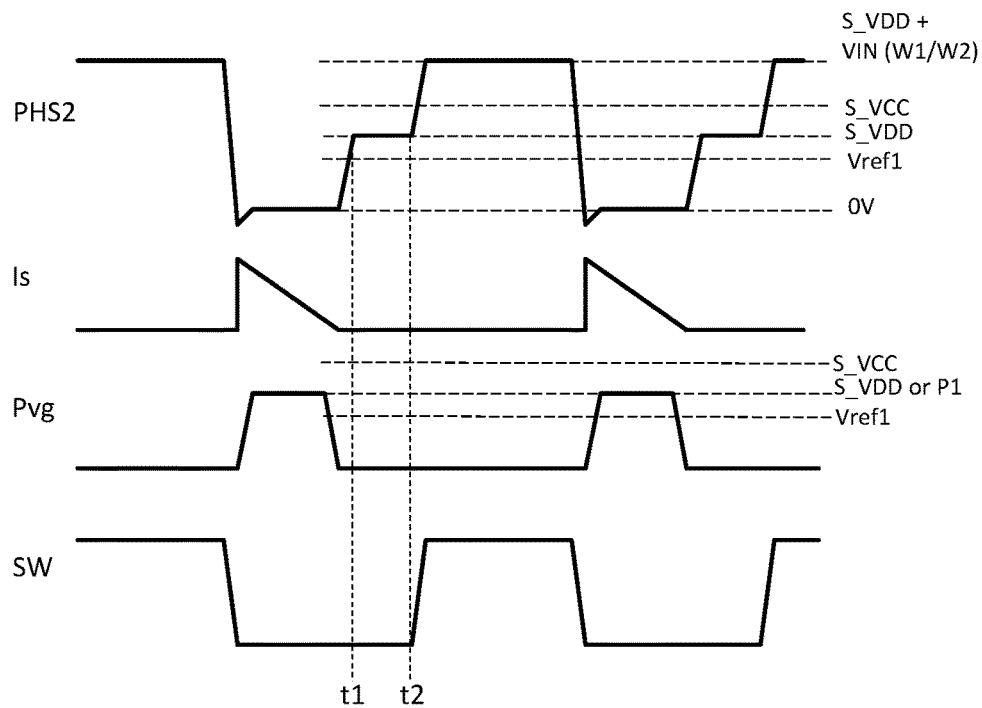
FIGS. 11A~11B, corresponding to FIG. 7A, show waveforms of different signals.
Figure 11B:
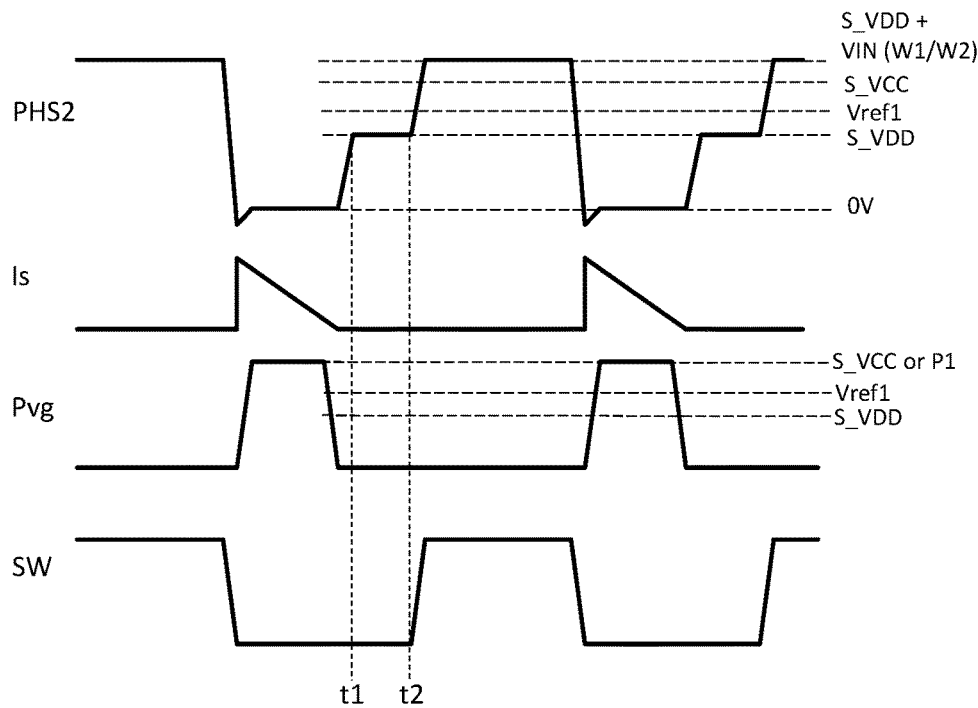

Please refer to FIG. 5 in conjugation with FIG. 7A and FIGS. 11A~11B. FIG. 5 shows a specific embodiment of a secondary side control circuit according to the present invention. FIG. 7A shows an embodiment of a power selection circuit 121 of a switch signal generation circuit 120 according to the present invention. FIGS. 11A~11B, corresponding to FIG. 7A, show waveforms of different signals.

As shown in FIG. 5, in one embodiment, the switch signal generation circuit 120 includes a power selection circuit 121 and a driver circuit 123. The power selection circuit 121 is configured to operably select the first power S_VDD or the second power S_VCC and convert the selected one to a third power P1. The third power P1 is provided to the driver circuit 123 as its operation power so that the driver circuit 123 is able to generate the synchronous rectifier switch signal Pvg with proper voltage levels sufficient to drive the synchronous rectifier switch 18. The power selection circuit 121 can determine whether to select the first power S_VDD or the second power S_VCC to generate the third power P1 by many ways. In one embodiment, the power selection circuit 121 can make such determination by comparing a voltage level of the first power S_VDD with a voltage level of a first reference threshold Vref1. In another embodiment, the power selection circuit 121 can make such determination by comparing a voltage level of the first power S_VDD with a voltage level of the second power S_VCC. In yet another embodiment, the power selection circuit 121 can make such determination based upon the secondary phase signal PHS2. In still another embodiment, the power selection circuit 121 can make such determination based upon the synchronous rectifier switch signal Pvg. The details of above-mentioned different embodiments will be described later.

As shown in FIG. 7A, in one embodiment, the power selection circuit 121 includes: a comparison circuit 1211, a first switch SW1 and a second switch SW2. The comparison circuit 1211 is configured to operably compare the voltage level of the first power S_VDD with the first reference threshold Vref1, to output a first switch control signal S1 and a second switch control signal S2. The first switch SW1 is coupled to the first power S_VDD and the first switch SW1 is turned ON or OFF according to the first switch control signal S1. The second switch SW2 is coupled to the second power S_VCC and the second switch SW2 is turned ON or OFF according to the second switch control signal S2.

Please refer to both FIG. 7A and FIG. 11A. When the voltage level of the first power S_VDD is greater than the first reference threshold Vref1, the first switch control signal S1 controls the first switch SW1 to be ON while the second switch control signal S2 controls the second switch SW2 to be OFF; thereby, the power selection circuit 121 selects the first power S_VDD and converts the first power S_VDD to the third power P1 (for example, in one embodiment as shown in FIG. 11A, the first switch SW1 is turned ON, and the first power S_VDD is provided directly as the third power P1). Thus, in this embodiment, the high level of the synchronous rectifier switch signal Pvg can reach to the level of the first power S_VDD.

Please refer to both FIG. 7A and FIG. 11B. When the voltage level of the first power S_VDD is smaller than the first reference threshold Vref1, the first switch control signal S1 controls the first switch SW1 to be OFF while the second switch control signal S2 controls the second switch SW2 to be ON; thereby, the power selection circuit 121 selects the second power S_VCC and converts the second power S_VCC to the third power P1 (for example, in one embodiment as shown in FIG. 11B, the second switch SW2 is turned ON, and the second power S_VCC is provided directly as the third power P1). In this embodiment, the high level of the synchronous rectifier switch signal Pvg can reach to the level of the second power S_VCC.

Figure 7B:
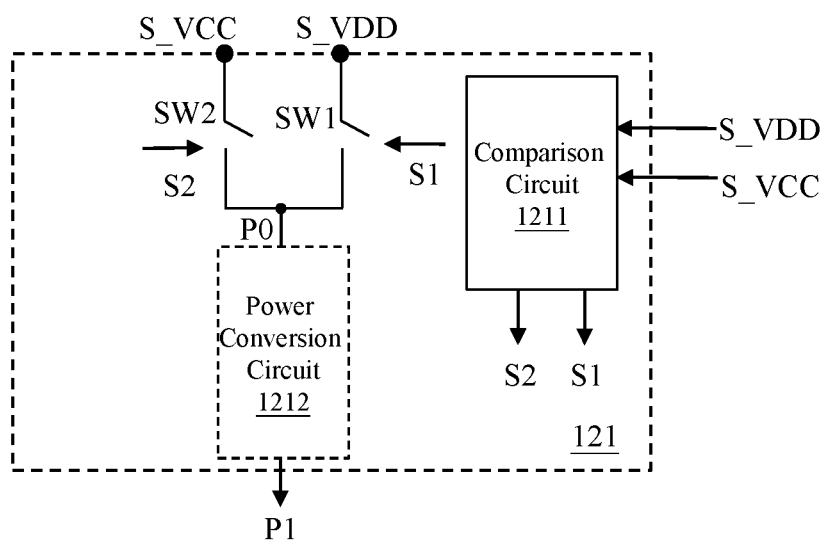
FIG. 7B shows another embodiment of a power selection circuit 121 of a switch signal generation circuit 120 according to the present invention.
Figure 12A:
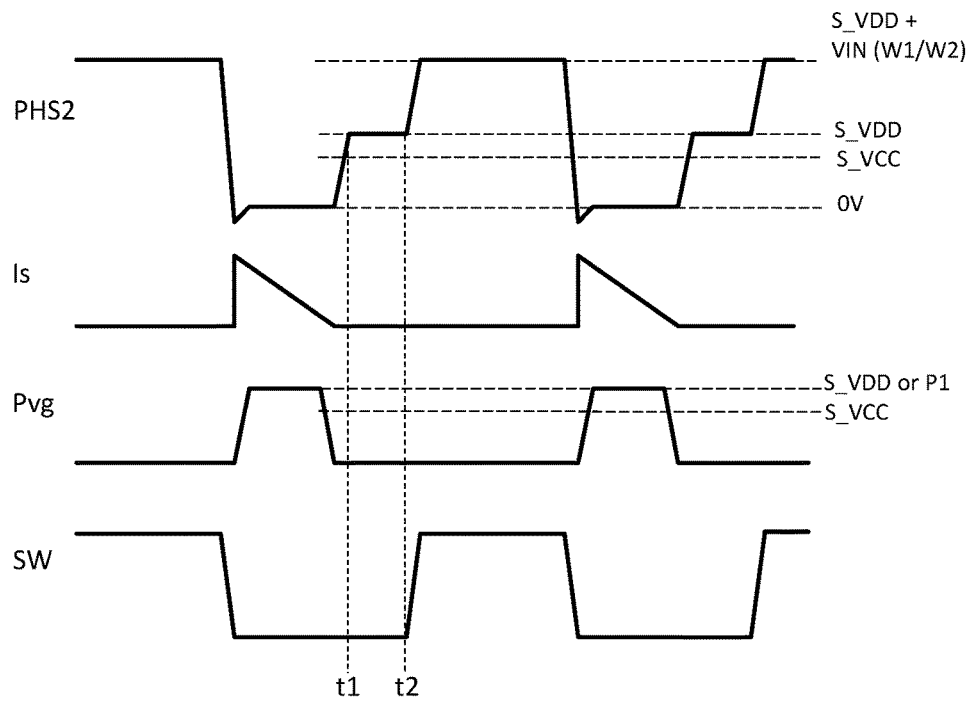
FIGS. 12A~12B, corresponding to FIG. 7B, show waveforms of different signals.
Figure 12B:
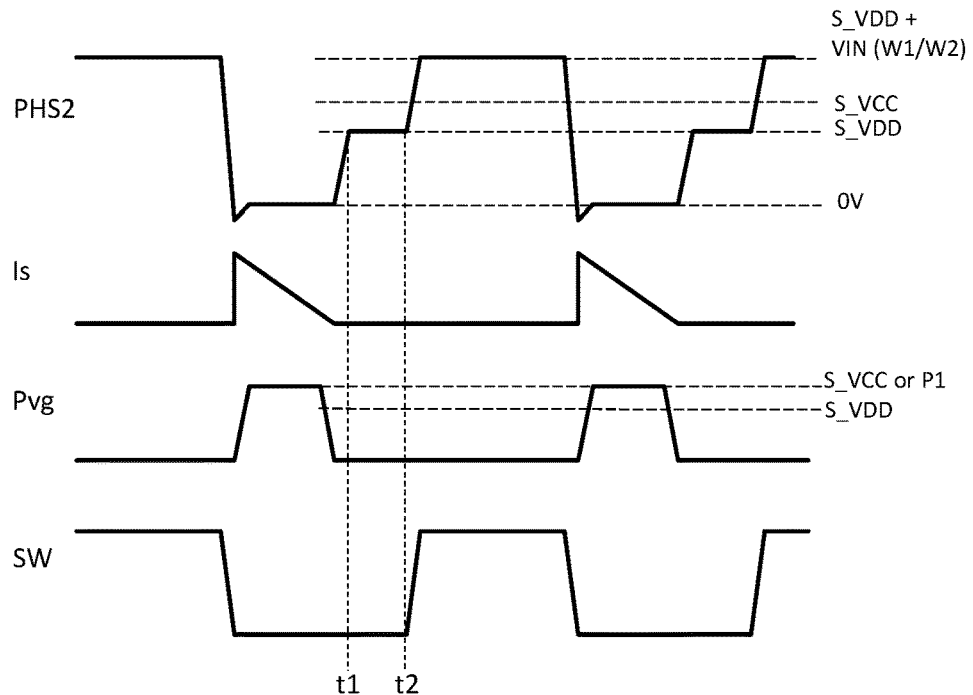

Please refer to FIG. 5 in conjugation with FIG. 7B and FIGS. 12A~12B. FIG. 7B shows another embodiment of a power selection circuit 121 of a switch signal generation circuit 120 according to the present invention. FIGS. 12A~12B, corresponding to FIG. 7B, show waveforms of different signals.

In one embodiment, the first reference threshold Vref1 can be the level of the second power S_VCC. In other words, in this embodiment, the power selection circuit 121 can compare the level of the first power S_VDD with the level of the second power S_VCC, and selects the higher one to generate the third power P1.

Please refer to both FIG. 7B and FIG. 12A. When the level of the first power S_VDD is greater than the level of the second power S_VCC, the first switch control signal S1 controls the first switch SW1 to be ON while the second switch control signal S2 controls the second switch SW2 to be OFF; thereby, the power selection circuit 121 selects the first power S_VDD and converts the first power S_VDD to the third power P1 (for example, in one embodiment as shown in FIG. 12A, the first switch SW1 is turned ON, and the first power S_VDD is provided directly as the third power P1). In this embodiment, the high level of the synchronous rectifier switch signal Pvg can reach to the level of the first power S_VDD.

Please refer to both FIG. 7B and FIG. 12B. When the level of the first power S_VDD is smaller than the level of the second power S_VCC, the first switch control signal S1 controls the first switch SW1 to be OFF while the second switch control signal S2 controls the second switch SW2 to be ON; thereby, the power selection circuit 121 selects the second power S_VCC and converts the second power S_VCC to the third power P1 (for example, in one embodiment as shown in FIG. 12B, the second switch SW2 is turned ON, and the second power S_VCC is provided directly as the third power P1). In this embodiment, the high level of the synchronous rectifier switch signal Pvg can reach to the level of the second power S_VCC.

As mentioned above, according to the present invention, when the level of the first power S_VDD is relatively lower (for example, when the level of the first power S_VDD is smaller than the first reference threshold Vref1 or smaller than the level of the second power S_VCC), the present invention can select the second power S_VCC to generate the third power P1 and thus can generate the synchronous rectifier switch signal Pvg with a sufficient level to fully turn ON the synchronous rectifier switch 18. On the other hand, when the level of the first power S_VDD is relatively higher (for example, when the level of the first power S_VDD is greater than the first reference threshold Vref1 or greater than the level of the second power S_VCC), because the synchronous rectifier switch signal Pvg generated according to the first power S_VDD is already able to keep the conduction resistance of the synchronous rectifier switch 18 to be minimum or relatively lower, the present invention will select the first power S_VDD to generate the third power P1. Thus, the present invention can reduce power consumption when the synchronous rectifier switch 18 is under operation.

In the above-mentioned embodiments shown in FIGS. 11A~11B and FIGS. 12A~12B, information of the level of the first power S_VDD can be obtained according to, for example but not limited to, the waveform of the secondary phase signal PHS2. As shown in FIGS. 11A~11B and FIGS. 12A~12B, in one embodiment, during the time period from t1 to t2, because the secondary side current Is is zero and the transformer 15 has already released its energy, the level of the secondary phase signal PHS2 is equal to the output voltage VOUT during time period from t1 to t2. In other words, during this period, information of the level of the first power S_VDD can be obtained according to the waveform of the secondary phase signal PHS2.

Figure 9A:
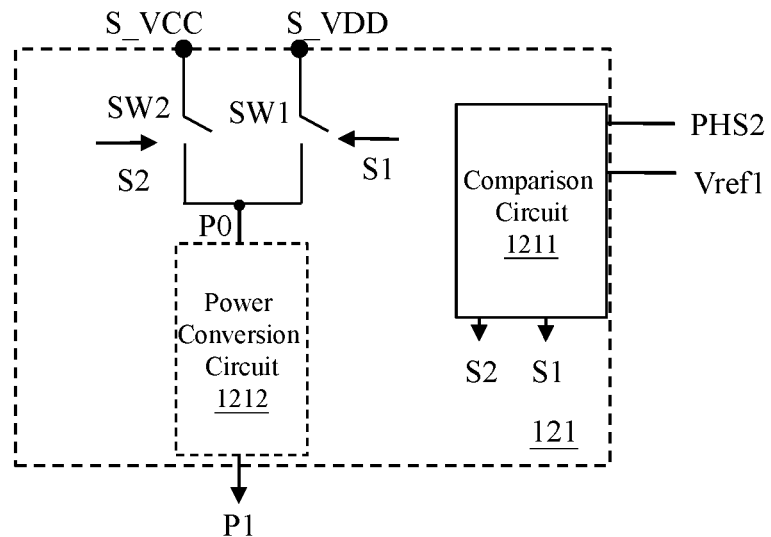
FIG. 9A shows still another embodiment of a power selection circuit 121 of a switch signal generation circuit 120 according to the present invention.
Figure 9B:
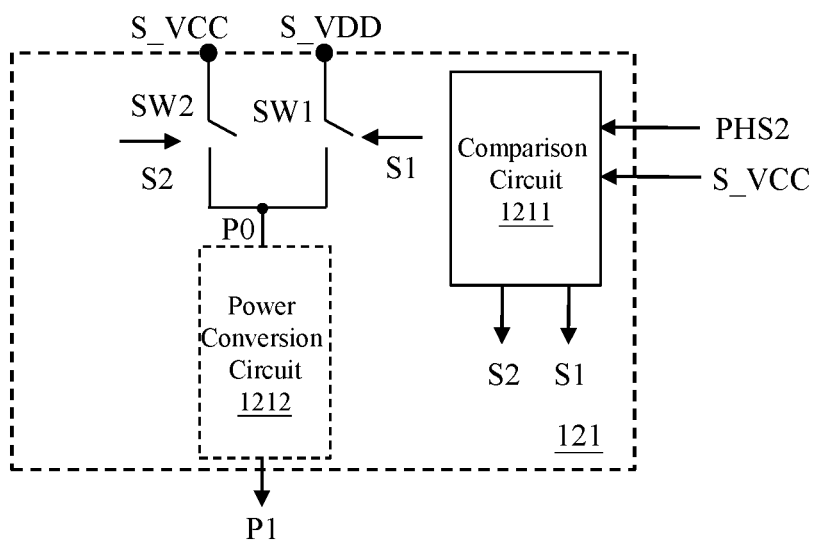
FIG. 9B shows still another embodiment of a power selection circuit 121 of a switch signal generation circuit 120 according to the present invention.

Please refer to FIG. 9A and FIG. 9B, which show two other embodiments of a power selection circuit 121 according to the present invention. The comparison circuit 1211 is configured to operably compare the waveform of the secondary phase signal PHS2 with the first reference threshold Vref1 or with the level of the second power S_VCC, and output the first switch control signal S1 and the second switch control signal S2 accordingly.

Figure 8:
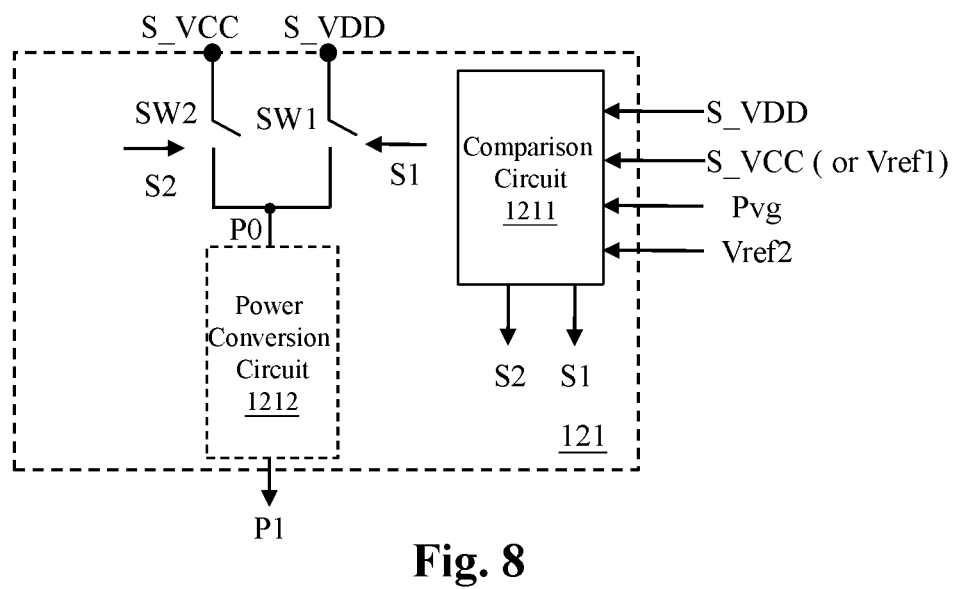
FIG. 8 shows yet another embodiment of a power selection circuit 121 of a switch signal generation circuit 120 according to the present invention.
Figure 13:
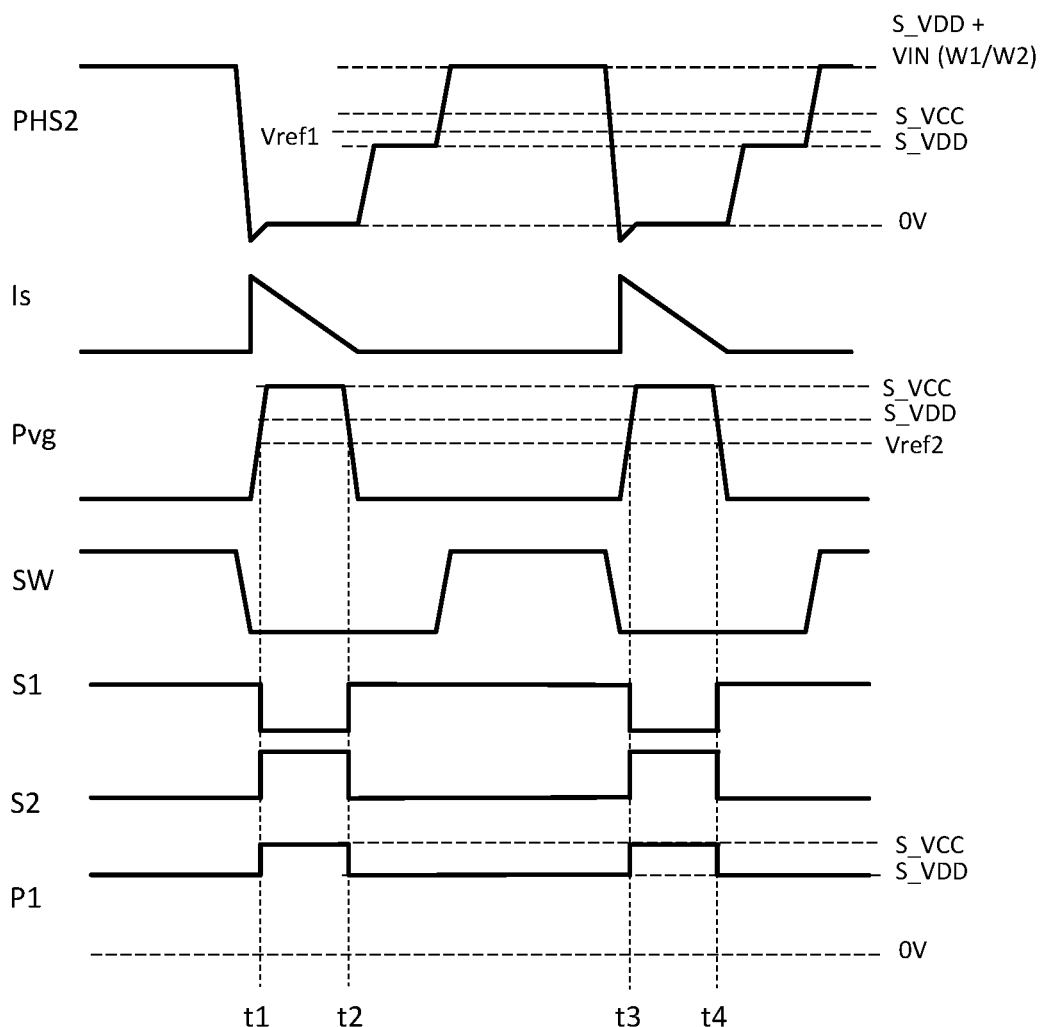
FIG. 13, corresponding to FIG. 8, shows waveforms of different signals.

Please refer to FIG. 8 and FIG. 13. FIG. 8 shows yet another embodiment of a power selection circuit 121 of a switch signal generation circuit 120 according to the present invention. FIG. 13, corresponding to FIG. 8, shows waveforms of different signals.

As shown in FIG. 8, in this embodiment, the power selection circuit 121 is configured to operably compare the level of the first power S_VDD with the first reference threshold Vref1 (or with the level of the second power S_VCC). When the level of the first power S_VDD is smaller than the first reference threshold Vref1 (or smaller than the level of the second power S_VCC), the power selection circuit 121 further compares the synchronous rectifier switch signal Pvg with a second reference threshold Vref2, and output the first switch control signal S1 and the second switch control signal S2 accordingly, to select the first power S_VDD or the second power S_VCC and convert the selected one to the third power P1.

Please refer to both FIG. 8 and FIG. 13. When the level of the first power S_VDD is smaller than the first reference threshold Vref1 (or smaller than the level of the second power S_VCC), and when the synchronous rectifier switch signal Pvg is smaller than the second reference threshold Vref2 (e.g., during the time period from t2 to t3), the first switch control signal S1 controls the first switch SW1 to be ON while the second switch control signal S2 controls the second switch SW2 to be OFF; thereby, the power selection circuit 121 selects the first power S_VDD and converts the first power S_VDD to the third power P1. In one embodiment, as shown in FIG. 13, during the time period from t2 to t3, the first switch SW1 is ON, and the first power S_VDD is provided as the third power P1. On the other hand, when the level of the first power S_VDD is smaller than the first reference threshold Vref1 (or smaller than the level of the second power S_VCC), and when the synchronous rectifier switch signal Pvg is greater than the second reference threshold Vref2 (e.g., during the time period from t1 to t2 or the time period from t3 to t4), the first switch control signal S1 controls the first switch SW1 to be OFF while the second switch control signal S2 controls the second switch SW2 to be ON; thereby, the power selection circuit 121 selects the second power S_VCC and converts the second power S_VCC to the third power P1. In one embodiment, as shown in FIG. 13, during the time period from t1 to t2 or the time period from t3 to t4, the second switch SW2 is ON, and the second power S_VCC is provided as the third power P1. In this embodiment, the high level of the synchronous rectifier switch signal Pvg can reach to the level of the second power S_VCC.

Preferably, in one embodiment, the second reference threshold Vref2 is smaller than the first power S_VDD. By this arrangement, when the synchronous rectifier switch signal Pvg is smaller than the second reference threshold Vref2 (e.g., as shown by the time period from t2 to t3 in FIG. 13), because the first power S_VDD is sufficient to supply the voltage level required by the synchronous rectifier switch signal Pvg, during the time period from t2 to t3 in FIG. 13, the power selection circuit 121 can select the first power S_VDD to generate the third power P1 instead of the second power S_VCC, whereby the power consumption is reduced and the power conversion efficiency is better.

In the embodiment of FIG. 8 and FIG. 13, the switching power loss Psw can be computed as follow:

$$Psw = VDrain*Is + S\_VDD*IVDD = [S\_VDD + VIN/(Np/Ns)]*[Cg*(S\_VCC - Vref2)*Fsw] + S\_VDD*[Cg*(Vref2 - 0V)*Fsw]$$

wherein, VDrain denotes a drain voltage of the synchronous rectifier switch 18; Is denotes a current (i.e., a secondary side current) through the synchronous rectifier switch 18; IVDD denotes a current of the first power S_VDD; Np/Ns denotes a turn ratio of the primary winding to the secondary winding; Cg denotes a parasitic capacitance of the synchronous rectifier switch 18; Fsw denotes an operation frequency of the synchronous rectifier switch 18.

Note that, in the embodiment of FIG. 8 and FIG. 13, in addition to the comparison between the first power S_VDD and the first reference threshold Vref1 (or the comparison between the first power S_VDD and the second power S_VCC), a further comparison between the synchronous rectifier switch signal Pvg and the second reference threshold Vref2 is performed to better determine which one of the first power S_VDD or the second power S_VCC should be selected to generate the third power P1, for driving the synchronous rectifier switch 18 with a lower power consumption. As a consequence, the switching power loss Psw can be reduced.

Figure 10A:
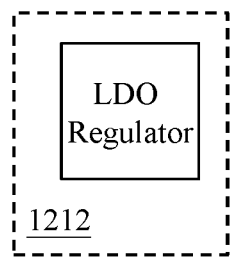
FIG. 10A shows an embodiment of a power conversion circuit 1212 of a secondary side control circuit according to the present invention.
Figure 10B:
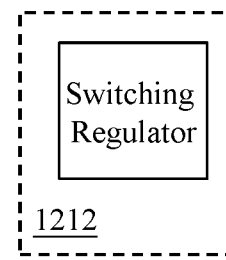
FIG. 10B shows another embodiment of a power conversion circuit 1212 of a secondary side control circuit according to the present invention.

In one embodiment, the above-mentioned power selection circuit 121 can further include a power conversion circuit (e.g., the power conversion circuit 1212 as shown in the embodiments of FIG. 7A, FIG. 7B, FIG. 8, FIG. 9A and FIG. 9B). The power conversion circuit 1212 is configured to convert the first power S_VDD or the second power S_VCC to the third power P1. In one embodiment, the power conversion circuit 1212 can be, for example but not limited to, a low dropout (LDO) regulator (as shown in FIG. 10A). In another embodiment, the power conversion circuit 1212 can be, for example but not limited to, a switching regulator (as shown in FIG. 10B).

Figure 10C:
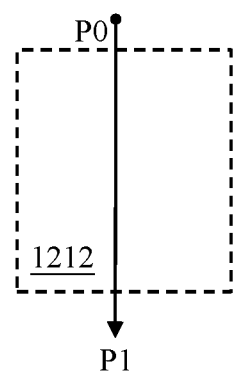
FIG. 10C shows yet another embodiment of a power conversion circuit 1212 of a secondary side control circuit according to the present invention.

In one embodiment, when the first switch SW1 is ON, the first power S_VDD can be provided directly as the third power P1, and/or, when the second switch SW2 is ON, the second power S_VCC can be provided directly as the third power P1. In other words, the power conversion circuit 1212 shown in FIG. 7A, FIG. 7B, FIG. 8, FIG. 9A and FIG. 9B can be a short-circuit, as shown in FIG. 10C. It should be explained that, in FIG. 11A, FIG. 11B, FIG. 12A, FIG. 12B and FIG. 13, the waveforms of the first power S_VDD and the second power S_VCC are shown based on the embodiment that the first power S_VDD is provided directly as the third power P1 and the second power S_VCC is provided directly as the third power P1, in order to explain the operation mechanism of the present invention in a simpler way for easier understanding. However, the present invention is not limited to such arrangement. For example, in the embodiment wherein the power conversion circuit 1212 is a LDO regulator or a switching regulator, the third power P1 can be lower than or higher than the first power S_VDD or the second power S_VCC. In the embodiment wherein the power conversion circuit 1212 is a LDO regulator or a switching regulator, the third power P1 can be regulated at a predetermined power level, which can provide an advantage that the synchronous rectifier switch 18 can be operated by an operation voltage which is sufficient but not too high, to reduce switching power loss.

In view of the above, the flyback power converter of the present invention can adaptively select the first power or the second power based upon different situations, to ensure that the generated synchronous rectifier switch signal Pvg is well able to fully turn ON the synchronous rectifier switch 18 under any different situations and to reduce the total power loss including the conduction power loss and the switching power loss.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, a device which does not substantially influence the primary function of a signal can be inserted between two devices or circuits shown to be indirect connection in the embodiments, such as a switch or a resistor. It is not limited for each of the embodiments described herein before to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A flyback power converter, which is configured to operably convert an input voltage to an output voltage at an output terminal of the flyback power converter, the flyback power converter comprising:
    a transformer, including a primary winding coupled to the input voltage and a secondary winding coupled to the output voltage;
    a power switch coupled to the primary winding, wherein the power switch is configured to be turned ON or OFF according to an operation signal, to control the primary winding so that the input voltage is converted to the output voltage;
    a switch control unit coupled to the power switch, wherein the switch control unit is configured to operably generate the operation signal according to a feedback signal related to the output voltage;
    a synchronous rectifier switch, which is coupled in serial to the secondary winding, wherein the synchronous rectifier switch and the secondary winding are coupled between the output terminal and a ground voltage level, and the synchronous rectifier switch and the secondary winding are coupled to each other through a secondary phase node, wherein the synchronous rectifier switch is configured to be turned ON or OFF according to a synchronous rectifier switch signal, so as to provide a synchronous rectification function; and
    a secondary side control circuit, which is coupled to the synchronous rectifier switch and the secondary winding, the secondary side control circuit including:
        a switch signal generation circuit, which is configured to operably generate the synchronous rectifier switch signal selectively according to a first power or a second power, to control the synchronous rectifier switch, wherein the first power is related to the output voltage and the second power is not the first power; and a first power conversion circuit, which is configured to operably convert a secondary phase signal, to generate the second power, wherein the secondary phase signal is a voltage signal on the secondary phase node;

wherein the switch signal generation circuit includes:
   a power selection circuit, which is configured to operably compare a level of the first power with a first reference threshold, to determine whether to select the first power or the second power, and convert the selected one to a third power; and
   a driver circuit, which is configured to operably generate the synchronous rectifier switch signal by adopting the third power as a power source of the driver circuit;
      wherein, when the level of the first power is greater than the first reference threshold, the power selection circuit selects the first power and converts the first power to the third power;
      wherein, when the level of the first power is smaller than the first reference threshold, the power selection circuit, during at least a period, selects the second power and converts the second power to the third power.

2. The flyback power converter of claim 1, wherein the first reference threshold is a level of the second power.

3. The flyback power converter of claim 2, wherein when the level of the first power is smaller than the level of the second power, the power selection circuit further compares the synchronous rectifier switch signal with a second reference threshold, to select and convert the first power or the second power;
   wherein, when the synchronous rectifier switch signal is greater than the second reference threshold, the power selection circuit selects the first power and converts the first power to the third power;
   wherein, when the synchronous rectifier switch signal is smaller than the second reference threshold, the power selection circuit selects the second power and converts the second power to the third power.

4. The flyback power converter of claim 1, wherein when the level of the first power is smaller than the first reference threshold, the power selection circuit further compares the synchronous rectifier switch signal with a second reference threshold, to determine whether to select the first power or the second power;
   wherein, when the synchronous rectifier switch signal is greater than the second reference threshold, the power selection circuit selects the first power and converts the first power to the third power;
   wherein, when the synchronous rectifier switch signal is smaller than the second reference threshold, the power selection circuit selects the second power and converts the second power to the third power.

5. The flyback power converter of claim 1, wherein information of the level of the first power is obtained according to a waveform of the secondary phase signal.

6. The flyback power converter of claim 1, wherein the power selection circuit includes:
   a comparison circuit, which is configured to operably compare the level of the first power with the first reference threshold, to output a first switch control signal and a second switch control signal;
   a first switch, which is coupled to the first power and which is configured to be turned ON or OFF according to the first switch control signal; and
   a second switch, which is coupled to the second power and which is configured to be turned ON or OFF according to the second switch control signal;
      wherein, when the level of the first power is greater than the first reference threshold, the first switch control signal controls the first switch to be ON while the second switch control signal controls the second switch to be OFF, whereby the power selection circuit selects the first power and converts the first power to the third power;
      wherein, when the level of the first power is smaller than the first reference threshold, the first switch control signal controls the first switch to be OFF while the second switch control signal controls the second switch to be ON, whereby the power selection circuit selects the second power and converts the second power to the third power.

7. The flyback power converter of claim 6, wherein when the level of the first power is smaller than the first reference threshold, the comparison circuit further compares the synchronous rectifier switch signal with the second reference threshold, to determine whether to select the first power or the second power;
   wherein, when the synchronous rectifier switch signal is smaller than the second reference threshold, the first switch control signal controls the first switch to be ON while the second switch control signal controls the second switch to be OFF, whereby the power selection circuit selects the first power and converts the first power to the third power;
   wherein, when the synchronous rectifier switch signal is greater than the second reference threshold, the first switch control signal controls the first switch to be OFF while the second switch control signal controls the second switch to be ON, whereby the power selection circuit selects the second power and converts the second power to the third power.

8. The flyback power converter of claim 6, wherein when the first switch is ON, the first power is provided directly as the third power; or when the second switch is ON, the second power is provided directly as the third power.

9. The flyback power converter of claim 6, wherein the power selection circuit further includes:
   a second power conversion circuit, which is configured to operably convert the first power or the second power to the third power.

10. The flyback power converter of claim 9, wherein the second power conversion circuit includes a low dropout (LDO) regulator or a switching regulator.

11. The flyback power converter of claim 1, wherein the first power conversion circuit includes a low dropout (LDO) regulator or a switching regulator.

12. The flyback power converter of claim 1, wherein a current output terminal of the synchronous rectifier switch is coupled to the secondary phase node and a current input terminal of the synchronous rectifier switch is coupled to the ground voltage level.

13. A secondary side control circuit of a flyback power converter, the flyback power converter being configured to operably convert an input voltage to an output voltage at an output terminal of the flyback power converter, wherein the flyback power converter includes: a transformer, including a primary winding coupled to the input voltage and a secondary winding coupled to the output voltage; a power switch coupled to the primary winding, wherein the power switch is configured to be turned ON or OFF according to an operation signal, to control the primary winding so that the input voltage is converted to the output voltage; a switch control unit coupled to the power switch, wherein the switch control unit is configured to operably generate the operation signal according to a feedback signal related to the output voltage; a synchronous rectifier switch, which is coupled in serial to the secondary winding, wherein the synchronous rectifier switch and the secondary winding are coupled between the output terminal and a ground voltage level, and the synchronous rectifier switch and the secondary winding are coupled to each other through a secondary phase node, wherein the synchronous rectifier switch is configured to be turned ON or OFF according to a synchronous rectifier switch signal, so as to provide a synchronous rectification function; the secondary side control circuit being coupled to the synchronous rectifier switch and the secondary winding of the transformer, the secondary side control circuit comprising:

a switch signal generation circuit, which is configured to operably generate the synchronous rectifier switch signal selectively according to a first power or a second power, to control the synchronous rectifier switch, wherein the first power is related to the output voltage and the second power is not the first power; and a first power conversion circuit, which is configured to operably convert a secondary phase signal, to generate the second power, wherein the secondary phase signal is a voltage signal on the secondary phase node;

wherein the switch signal generation circuit includes:

a power selection circuit, which is configured to operably compare a level of the first power with a first reference threshold, to determine whether to select the first power or the second power, and convert a selected one to a third power; and a driver circuit, which is configured to operably generate the synchronous rectifier switch signal by adopting the third power as a power source of the driver circuit;

wherein, when the level of the first power is greater than the first reference threshold, the power selection circuit selects the first power and converts the first power to the third power;

wherein, when the level of the first power is smaller than the first reference threshold, the power selection circuit, during at least a period, selects the second power and converts the second power to the third power.

14. The secondary side control circuit of the flyback power converter of claim 13, wherein the first reference threshold is a level of the second power.

15. The secondary side control circuit of the flyback power converter of claim 14, when the level of the first power is smaller than the level of the second power, the power selection circuit further compares the synchronous rectifier switch signal with a second reference threshold, to select and convert the first power or the second power;

wherein, when the synchronous rectifier switch signal is greater than the second reference threshold, the power selection circuit selects the first power and converts the first power to the third power;

wherein, when the synchronous rectifier switch signal is smaller than the second reference threshold, the power selection circuit selects the second power and converts the second power to the third power.

16. The secondary side control circuit of the flyback power converter of claim 13, wherein when the level of the first power is smaller than the first reference threshold, the power selection circuit further compares the synchronous rectifier switch signal with a second reference threshold, to determine whether to select the first power or the second power;

wherein, when the synchronous rectifier switch signal is greater than the second reference threshold, the power selection circuit selects the first power and converts the first power to the third power;

wherein, when the synchronous rectifier switch signal is smaller than the second reference threshold, the power selection circuit selects the second power and converts the second power to the third power.

17. The secondary side control circuit of the flyback power converter of claim 13, wherein information of the level of the first power is obtained according to a waveform of the secondary phase signal.

18. The secondary side control circuit of the flyback power converter of claim 13, wherein the power selection circuit includes:

a comparison circuit, which is configured to operably compare the level of the first power with the first reference threshold, to output a first switch control signal and a second switch control signal;

a first switch, which is coupled to the first power and which is configured to be turned ON or OFF according to the first switch control signal; and a second switch, which is coupled to the second power and which is configured to be turned ON or OFF according to the second switch control signal;

wherein, when the level of the first power is greater than the first reference threshold, the first switch control signal controls the first switch to be ON while the second switch control signal controls the second switch to be OFF, whereby the power selection circuit selects the first power and converts the first power to the third power;

wherein, when the level of the first power is smaller than the first reference threshold, the first switch control signal controls the first switch to be OFF while the second switch control signal controls the second switch to be ON, whereby the power selection circuit selects the second power and converts the second power to the third power.

19. The secondary side control circuit of the flyback power converter of claim 18, wherein when the level of the first power is smaller than the first reference threshold, the comparison circuit further compares the synchronous rectifier switch signal with the second reference threshold, to determine whether to select the first power or the second power;

wherein, when the synchronous rectifier switch signal is smaller than the second reference threshold, the first switch control signal controls the first switch to be ON while the second switch control signal controls the second switch to be OFF, whereby the power selection circuit selects the first power and converts the first power to the third power;

wherein, when the synchronous rectifier switch signal is greater than the second reference threshold, the first switch control signal controls the first switch to be OFF while the second switch control signal controls the second switch to be ON, whereby the power selection circuit selects the second power and converts the second power to the third power.

20. The secondary side control circuit of the flyback power converter of claim 18, wherein when the first switch is ON, the first power is provided directly as the third power;

or when the second switch is ON, the second power is provided directly as the third power.

21. The secondary side control circuit of the flyback power converter of claim 18, wherein the power selection circuit further includes:
   a second power conversion circuit, which is configured to operably convert the first power or the second power to the third power.

22. The secondary side control circuit of the flyback power converter of claim 21, wherein the second power conversion circuit includes a low dropout (LDO) regulator or a switching regulator.

23. The secondary side control circuit of the flyback power converter of claim 13, wherein the first power conversion circuit includes a low dropout (LDO) regulator or a switching regulator.

* * * * *